UNITED STATES PATENT OFFICE.

ADOLF ISRAEL AND RICHARD KOTHE, OF ELBERFELD, GERMANY, ASSIGNORS TO FARBENFABRIKEN OF ELBERFELD CO., OF NEW YORK, N. Y.

AZO DYE.

SPECIFICATION forming part of Letters Patent No. 675,629, dated June 4, 1901.

Application filed December 27, 1900. Serial No. 41,247. (No specimens.)

*To all whom it may concern:*

Be it known that we, ADOLF ISRAEL and RICHARD KOTHE, doctors of philosophy, chemists, (assignors to the FARBENFABRIKEN OF ELBERFELD COMPANY, of New York,) residing at Elberfeld, Germany, have invented a new and useful Improvement in Azo Dyes; and we hereby declare the following to be a clear and exact description of our invention.

In two former applications for Letters Patent we have described the production of new urea and thio-urea compounds having the formula:

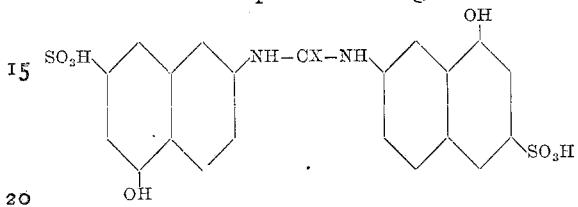

(in which formula X means an atom of oxygen, which may be replaced by an atom of sulfur.)

Our present invention relates to the production of valuable new azo coloring-matters by causing two molecules of the same or two different suitable diazo compounds to act on the said urea or thio-urea compounds.

We point out specifically that by the term "diazo compound" in the following specification we intend to denote a simple diazo compound as well as a diazotized amidoazo compound, such as diazoazobenzene, diazoazotoluene, or the like.

The new dyestuffs prepared in the above-defined manner are alkaline salts of acids having most probably the following general formula:

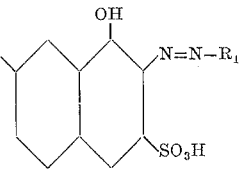

(in which formula X means an atom of oxygen, which may be replaced by an atom of sulfur, the groups $-N=N-R$ and $-N=N-R_1$ meaning either the same or two different radicals of diazo compounds, such as diazobenzene, diazotoluene, diazoazobenzene, acetylamidodiazobenzene, beta-diazonaphthalene, or the like,) and are from reddish-brown to dark-brown powders having a metallic luster soluble in water with from orange to bluish-red color, being scarcely soluble in concentrated hydrochloric acid. They dye unmordanted cotton from orange to red shades which are of a remarkable fastness to light.

In carrying out our new process practically we can proceed as follows, the parts being by weight: 17.6 parts of ortho-anisidin are diazotized in the usual manner with the aid of fifty-six parts of hydrochloric acid (of 15° Baumé) and ten parts of sodium nitrite. The resulting diazo solution is then slowly stirred into a solution prepared from 39.2 parts of the sodium salt of carbonyldioxydinaphthylamindisulfonic acid, which is the scientific name of one of the new urea compounds, (prepared from $beta_1$-amido-$alpha_3$-naphthol-$beta_4$-sulfonic acid and $beta_1$-amido-$alpha_4$-naphthol-$beta_3$-sulfonic acid,) which solution is previously mixed with thirty parts of sodium carbonate. After being stirred for several hours the formation of the dyestuff will be complete. It is then precipitated by the addition of common salt, filtered off, and dried. The new coloring-matter thus obtained is the sodium salt of an acid having most probably the following formula:

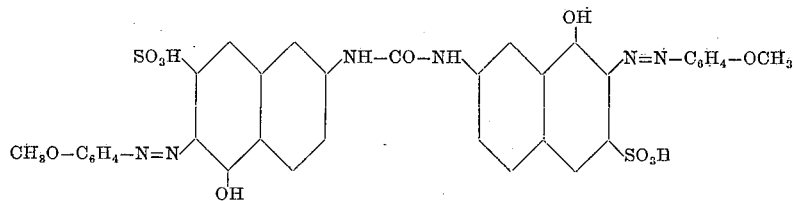

and is a reddish-brown powder having a metallic luster soluble in water with a bluish-red color. It is but scarcely soluble in concentrated hydrochloric acid, while it is dissolved by concentrated sulfuric acid (of 66° Baumé) with a violet color, which is changed into blue on the addition of a small quantity of ice, while on the addition of a larger quantity of ice a violet precipitate is obtained.

The new coloring-matter dyes unmordanted cotton bluish-red shades which are fast to acids and to light.

The process proceeds in an analogous manner if instead of the diazo compound mentioned in the example other diazo compounds are employed. If two different diazo compounds are employed, the first component is combined with the urea derivative, preferably in a slightly-acid solution, and the second in an alkaline solution. On using, for instance, one molecule of diazotized anilin and one molecule of diazotized acetyl-para-phenylenediamin or one molecule of diazotized beta-naphthylamin and one molecule of diazotized amidobenzoic acid red dyestuffs are obtained.

Having now described our invention and in what manner the same is to be performed, what we claim as new, and desire to secure by Letters Patent, is—

1. The herein-described new azo dyestuffs which are alkaline salts of acids having most probably the general formula:

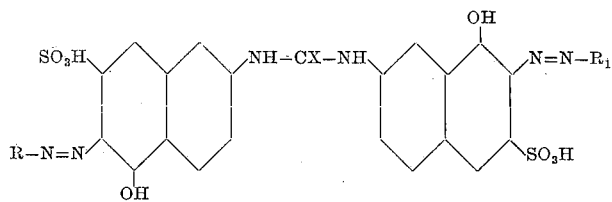

X meaning in this formula an atom of oxygen which may be replaced by an atom of sulfur, the groups —N=NR and —N=NR₁ meaning the radicals of "diazo compounds" and which are from reddish-brown to dark-brown powders having a metallic luster, soluble in water with from orange to bluish-red color, which in the form of its sodium salt is a reddish-brown powder having a metallic luster, soluble in water with a bluish-red color, scarcely soluble in concentrated hydrochloric acid, being dissolved by concentrated sulfuric acid (of 66° Baumé) with a violet color which is changed into blue by the addition of a small quantity of ice, while on the addition of a larger quantity of ice a violet precipitate is obtained, dyeing unmordanted cotton bluish- scarcely soluble in concentrated hydrochloric acid, dyeing unmordanted cotton from orange to red shades which are fast to light, substantially as hereinbefore described.

2. The herein-described new disazo dyestuff being an alkaline salt of an acid having most probably the following formula:

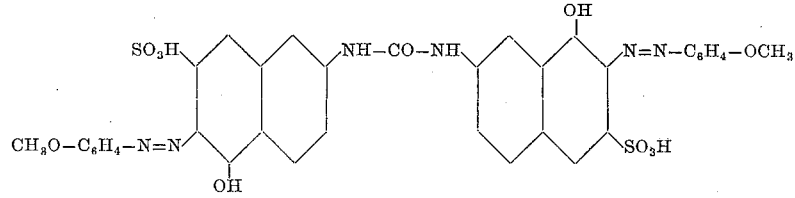

red shades which are fast to acids and to light, substantially as hereinbefore described.

In testimony whereof we have signed our names in the presence of two subscribing witnesses.

ADOLF ISRAEL.
RICHARD KOTHE.

Witnesses:
OTTO KÖNIG,
J. A. RITTERSHAUS.